June 15, 1926.
C. DOERING ET AL
MOTOR VEHICLE LAMP
Filed August 22, 1923
1,589,129
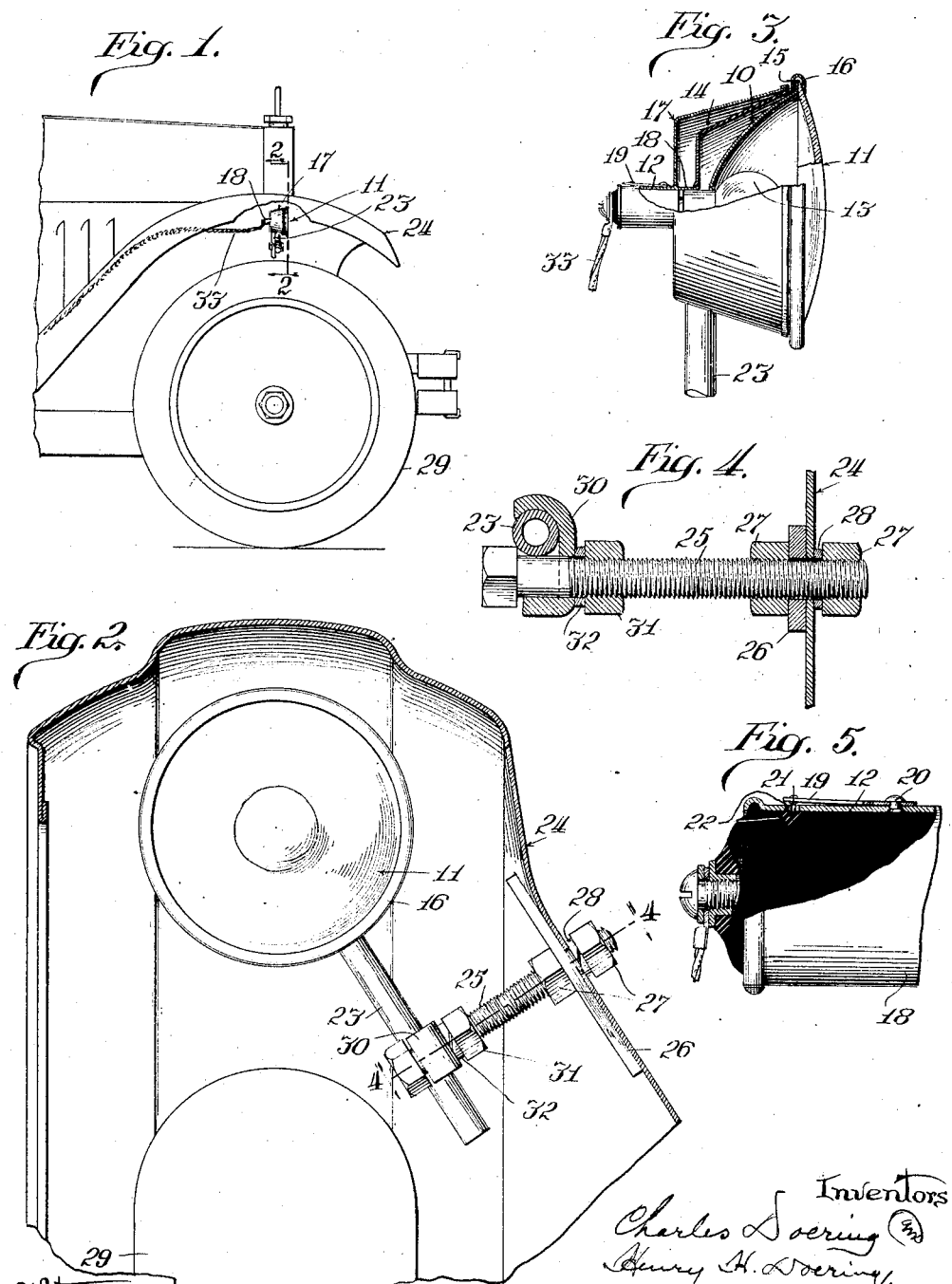

Patented June 15, 1926.

1,589,129

UNITED STATES PATENT OFFICE.

CHARLES DOERING AND HENRY H. DOERING, OF CHICAGO, ILLINOIS, ASSIGNORS TO DOERING MANUFACTURING COMPANY, OF CHICAGO, ILLINOIS, A CORPORATION OF ILLINOIS.

MOTOR-VEHICLE LAMP.

Application filed August 22, 1923. Serial No. 658,789.

Our invention relates more particularly to search-lights or lamps for motor driven vehicles adapted to be so mounted and arranged that the front fender or mud-guards of the vehicle will constitute the shield for the lamp; the object of the invention being to provide a searchlight or lamp capable of properly lighting the roadway for a suitable distance and in a proper manner to assist the driver while at the same time being incapable of producing a glare which would in any way blind or confuse approaching pedestrians or drivers of approaching vehicles.

Another object of the invention is to provide a lamp which may be readily secured in place and adjusted to varying conditions in different types of automobiles and to suit the desires of the user.

A further object of the invention is to provide a lamp provided with a shell or housing composed of a plurality of spaced walls adapted to prevent condensation within the housing or "sweating" of the reflector and lens, as, however, is frequently the case with automobile lamps or spotlights as at present employed.

The various objects and advantages of our invention will all be more fully comprehended from the detailed description of the accompanying drawing, wherein:—

Figure 1 is a partial elevation of the forward end of an automobile, with a portion of the front fender broken away to show the position of the lamp.

Figure 2 is a front sectional elevation taken on the line 2—2 of Figure 1 looking in the direction of the arrows.

Figure 3 is a detail sectional side elevation of our improved lamp.

Figure 4 is a detail sectional view, taken on the line 4—4 of Figure 2 looking in the direction of the arrows.

Figure 5 is a detail view in partial section of the bulb-holding socket adjusting means.

Our invention contemplates the use of a lamp somewhat of the general type of "spotlight" used in connection with automobile vehicles and consisting of the usual more or less conical shell 10,—which may also constitute the reflector,—on the flanged rim whereof the lens 11 is seated. The shell or reflector 10 is apertured to receive the socket-member 12 in which the stem of the bulb 13 is suitably mounted. The reflector-shell 10 is enclosed by a suitable shell or housing 14 preferably of sheet metal and provided with straight sloping sides as shown in Figure 3 so as to provide a comparatively large air space between the housing 14 and the reflector-shell 10. The housing 14 is flared or flanged outwardly at 15 to provide a proper seat for the flanged perimeter of the reflector-shell and to receive a suitable clamping ring 16 thereabout. The clamping ring 16 is in the nature of a split ring of resilient metal, U-shaped in crosssection, to provide a circumferential groove on the inner perimeter which receives the flared or flanged rim 15 of the housing 14 and to also slightly overlap the perimeter of the lens 11 when the split ring 16 has been sprung into place. One end of the split ring is provided with a pivoted portion or continuation adapted to telescope over the other end of the ring and have adjustable holding contact therewith by means of slight burrs and indentations formed on the pivoted portion and the opposite end of the ring proper.

The housing or shell 14 in turn is surrounded by an outer shell 17, of size sufficient to provide an air space between it and the shell or housing 14 and to terminate a slight distance from the flange 15 of housing 14 and not adapted to snugly fit entirely about the housing 14 so as to provide minute space between the perimeter of shell or housing 17 and the shell or housing 14, which will permit escape of heated air from the space or chamber between the housings. The intermediate shell or housing 14 is provided with a central tubular extension 18 adapted to extend through an aperture in the outer shell or housing 17; the housing 17 being preferably integrally secured to the stem 18, by welding, soldering or otherwise, in order that the relation between the shells or housings 14 and 17 may be maintained. The stem 18 is formed to receive the socket member 12 which latter is slidably arranged in the tubular extension 18 so as to permit adjustment of the bulb 13 relative to the reflector and lens in order to secure proper focus. In order to maintain the bulb in its adjusted position, the stem 18 is shown provided with a spring 19 in the nature of a flat strip of resilient metal, one end whereof is secured to the stem 18, as for example by means of rivet 20, while the free end is provided with a burr or pin 21 or angularly disposed portion adapted to extend through a small aperture 22 in the stem 18 and to firmly engage with the socket member 12. With this construction, it is apparent that the use of the usual small screws for holding the socket member in its adjusted positions is eliminated and the adjustment permitted and maintained without the use of a screw-driver or other special implement; the adjustment being obtained by merely lifting the spring 19 and forcing the socket member inwardly or outwardly as required. With this construction the difficulties that have been encountered through loss of screws due to vibration and otherwise is avoided and the loss of time required in obtaining adjustment entirely obviated.

The lamp, preferably the intermediate housing 14, is provided with an arm or rod 23 which may extend through a suitable opening in the outer shell or housing 17; the rod 23 being preferably tubular and of suitable length for the purpose of supporting the lamp within the forward end of the fender 24 of the vehicle by means of a suitable bracket which is more clearly shown in Figure 4. The bracket, as exemplified in the drawing, comprises a threaded rod or bolt 25 which is intended to be disposed through an aperture in the upwardly disposed side portion of the fender 24 adjacent to the body of the vehicle at a point slightly beneath the upper curved side of the fender as shown in Figure 2; the bolt being provided preferably with a suitable plate or large washer 26 adapted to extend flush with the inner side of the fender 24, as shown in Figure 2. The threaded end of the bolt or rod 25 is provided with nuts 27, 27 arranged on opposite sides of the fender portion and plate 26 as shown and preferably with a locking washer as at 28 therebetween. With this arrangement, the rod or bolt may be securely fastened to the fender 24 and arranged so as to have the inner free end of the rod or bolt 25 in a plane slightly above the tire 29 of the wheel. The inner or head end of the rod or bolt is provided with a clip 30 apertured to move lengthwise of the rod or bolt and provided with the bent ends; the larger of which is slightly curved to fit about the pillar or post 23 of the lamp, see Figure 4; while the other or smaller bent end is adapted to extend practically flush with the rod or bolt as shown. The bolt 25 is also provided with a nut 31 and locking washer 32; the nut being adapted to be screwed into firm relation with the washer and the latter forced into snug relation with the side of the clip 30 after the pillar or post 23 of the lamp has been placed between the head of the bolt 25 and the curved or angular end of clip 30.

This method of attachment permits the lamp to be secured within the fender 24 at a point immediately above the forward wheel through movement of the lamp perpendicular to the bolt, while at the same time permitting the lamp to be rotated on the axis of the post 23 so as to cause the light-rays to be thrown in the desired direction; the attachment permitting our improved lamp to be applied to different types of automobiles wherein the curvature of the fender or mudguard and relation of the fender to the wheel vary.

Furthermore, with the type of clip disclosed, the lamp may not only have sidewise adjustment about the axis of the post 23, but it may also have horizontal forward and rearward swinging adjustment relative to the axis of the bolt 25, before the nut and locking washer 31—32 have been screwed into firm relation with the clip 30, whereby the clip 30 with the rod 23 will be forced toward the head of the bolt 25 and securely gripped in place.

With the lamp arranged within the fender at a point where the lamp proper is substantially in vertical alignment with the axle of the wheel and therefore a distance removed from the forward end of the fender, it is evident that the lamp-bulb and reflector will be more or less hidden from the eye of a person approaching the machine from the front; that is to say, the bulb will be substantially in a plane above the forward edge of the fender and as a result the glare or blinding effect usually encountered will be eliminated; thus providing the automobile with a lamp whereby a proper lighting of the roadway will be obtained, but without the danger to approaching pedestrians or the driver of an approaching vehicle. At the same time, this arrangement of the searchlight or lamp permits the automobile to be driven in cities or localities in keeping with the ordinances, without necessitating a dimming of the light while other machines are approaching, so that the danger to the driver of the vehicle resulting from his dimmed lights will also be eliminated and a constant lighting of the roadway obtained.

We have found that where the ordinary clear bulb is employed, materially better results are obtained by employing a lens of a certain shade of blue, namely a daylight blue whereby a superior white light is produced which is more effective in properly lighting a dark or wet roadway; our improved lamp producing a better lighting effect than is obtainable with the usual clear lens and bulb, while at the same time the forward part of the fender acts as a deflector or shield and prevents the upward spread of the light-rays and consequently eliminates the usual glare encountered with automobile lamps as at present employed.

The lead-line or wire 33 may extend from the lamp beneath the fender and be brought up beneath the body of the vehicle to a suitable switch which may be arranged on the dash of the automobile and thus enable the driver to control his lights. The method of mounting the lamp enables the same to be easily removed and replaced when necessary; while the construction of the lamp housing will prevent the "sweating" of the lens and reflector.

The invention in its simplest embodiment has been shown in the drawing and has been described in terms which are employed merely as terms of description and not as terms of limitation, as structural modifications are possible and may be made without, however, departing from the spirit of our invention.

What we claim is:

1. In a lamp of the character described, a housing composed of a number of shells spaced apart to provide air chambers therebetween, with the perimeters of two of the shells so related as to permit circulation of air between the walls, a reflector shell removably mounted in the inner shell and flanged at its perimeter, said inner shell being provided with a lamp-holding stem disposed through the other shell of the housing, a lens mounted on the perimeter of the reflector, and a grooved ring adapted to encircle and receive the perimeter of the lens and the flanged perimeters of the reflector and the inner shell of the housing for clamping the parts in place, while the outer shell is held in place by the lamp-holding stem.

2. In a lamp of the character described, a housing composed of a plurality of spaced shells contacting with each other adjacent to their perimeters and formed to provide air spaces between the shells, the inner shell being provided with a lamp-socket holding stem extending centrally rearward from the rear wall of the inner shell and through the rear wall of the outer shell, the perimeter of the inner shell being flanged outwardly, a reflector shell removably mounted in the inner shell and flanged at its perimeter, a lens mounted on the perimeter of the reflector shell, a bulb-holding member slidable in said stem, a spring detent secured to the stem and adapted to have frictional relation with said bulb-holding member to hold the latter in its adjusted positions, and a grooved ring adapted to encircle the perimeter of the lens and the flanged perimeters of the reflector shell and the inner shell for clamping the parts in place.

CHARLES DOERING.
HENRY H. DOERING.